(12) United States Patent
McCormick et al.

(10) Patent No.: US 11,120,171 B2
(45) Date of Patent: Sep. 14, 2021

(54) SYSTEM AND METHOD FOR CONSTRUCTION COST ESTIMATION FOR NON-COMPUTER AIDED DESIGN (CAD) FILES

(71) Applicant: MCCORMICK SYSTEMS, INC., Chandler, AZ (US)

(72) Inventors: Todd McCormick, Chandler, AZ (US); Ed Riggers, Chandler, AZ (US)

(73) Assignee: MCCORMICK SYSTEMS LLC., Chandler, AZ (US)

( * ) Notice: Subject to any disclaimer, the term of this patent is extended or adjusted under 35 U.S.C. 154(b) by 200 days.

(21) Appl. No.: 16/570,641

(22) Filed: Sep. 13, 2019

(65) Prior Publication Data

US 2021/0081504 A1   Mar. 18, 2021

(51) Int. Cl.
*G06F 30/13* (2020.01)
*G06F 30/392* (2020.01)
*G06F 111/04* (2020.01)
*G06F 113/16* (2020.01)

(52) U.S. Cl.
CPC .......... *G06F 30/13* (2020.01); *G06F 30/392* (2020.01); *G06F 2111/04* (2020.01); *G06F 2113/16* (2020.01)

(58) Field of Classification Search
None
See application file for complete search history.

(56) References Cited

U.S. PATENT DOCUMENTS 4,831,725 A * 5/1989 Dunham ............... G06F 30/394
29/847
6,145,117 A * 11/2000 Eng ......................... G06F 30/39
716/105

(Continued)

FOREIGN PATENT DOCUMENTS

| CN | 107368909 | 11/2017 |
| JP | 09091319 | 4/1997 |

(Continued)

OTHER PUBLICATIONS

Electrical Detailing Source: http://www.proyatech.com/en/menu-products/menu-comosys/menu-comosys-electrical.html.

(Continued)

*Primary Examiner* — Craig C Dorais
(74) *Attorney, Agent, or Firm* — Weiss & Moy, P.C.; Jeffrey D. Moy (57) ABSTRACT

A computing device has a processor. A display is coupled to the processor. A user interface is coupled to the processor for entering data into the computing device. A memory is coupled to the processor, the memory storing program instructions that when executed by the processor, causes the processor to: display a floorplan of a blueprint file, wherein the blueprint file is a non-CAD file; select a scale factor for the floorplan; mark and label at least one electrical panel; generate wire routes from selected points on the floorplan to a desired electrical panel of the at least one electrical panel, wherein generating wire routes comprises generating a straight line path from one of the selected points to the desired electrical panel when a direct route is selected; and generate a cost for each of the wire routes generated.

20 Claims, 7 Drawing Sheets

(56) References Cited

U.S. PATENT DOCUMENTS

| | | | |
|---|---|---|---|
| 2003/0023947 A1* | 1/2003 | Sakakura | B60R 16/0207 716/126 |
| 2004/0230403 A1* | 11/2004 | Tsuchiya | G06F 30/18 703/1 |
| 2006/0247902 A1 | 11/2006 | Rourke | |
| 2014/0244219 A1 | 8/2014 | Pappoppula et al. | |
| 2017/0286568 A1 | 10/2017 | Dean et al. | |

FOREIGN PATENT DOCUMENTS

| | | |
|---|---|---|
| JP | 6139720 | 5/2017 |
| JP | 108280623 | 7/2018 |
| JP | 2018142312 | 9/2018 |
| JP | 2018163472 | 10/2018 |

OTHER PUBLICATIONS

Design Estimating Source: https://www.mccormicksys.com/design-estimating-pro/.

* cited by examiner

SYSTEM AND METHOD FOR CONSTRUCTION COST ESTIMATION FOR NON-COMPUTER AIDED DESIGN (CAD) FILES

FIELD

The present application generally relates to construction cost estimation, and, more particularly, to a construction cost estimation application that allows for a blueprint file to be loaded, electrical wiring/cable to be manually or automatically drawn between a device needing electrical power and an electrical panel and a cost estimated associated with the electrical wiring/cable installation.

BACKGROUND

In most construction projects, project owners may use cost estimates in order to determine a project's scope, feasibility and to allocate a proper budget. Project owners may use an estimator in order to provide an estimated cost of the construction project. In the past, estimators may have manually calculated the budget cost by using the blueprints prepared for the construction project. The estimator may review each blueprint, calculate actual dimensions and parameters from blueprint plans, and make quantity estimates from the calculations. It is tedious, time consuming and often inaccurate to make such calculations by hand. To make building cost estimates, for example, it is necessary to take dimensions from the plan, scale these up to actual size, calculate such parameters as area, length or volume from the dimensions, and then convert these parameters into quantities of materials required and their cost. Inaccuracies in such estimates will involve over or under ordering of materials and consequent problems. If any subsequent changes are made to the plans, the entire process must be repeated.

With developments in computerized technology, the estimation process has become more automized for some estimators. Computer based programs have been developed to help in the estimation process. Unfortunately, these programs can only utilize computer aided drafting (CAD) drawings. In these computer programs, CAD representations of the blueprint information may be inputted into the computer program. The computer program receives the CAD representations and calculate some of the information required for preparing takeoff estimates therefrom.

Presently, most cost estimation programs use CAD files. CAD files are generally able to store design data information. Design data information is generally a set of information about parts, assemblies, bill of materials, drawings and dependencies between them as well as other information. Thus, these types of cost estimation programs are generally able to extract this information from the CAD files and calculate some of the information required for preparing takeoff estimates therefrom. Unfortunately, most estimators are not given CAD files and are instead given noneditable files to prepare the takeoff estimates. Thus, these cost estimation programs cannot be used.

Therefore, it would be desirable to provide a system and method that overcome the above identified concerns, as well as additional challenges which will become apparent from the disclosure set forth below.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a computing device is disclosed. The computing device has a processor. A display is coupled to the processor. A user interface is coupled to the processor for entering data into the computing device. A memory coupled to the processor, the memory storing program instructions that when executed by the processor, causes the processor to: display a floorplan of a blueprint file, wherein the blueprint file is a non-CAD file; select a scale factor for the floorplan; mark and labeling at least one electrical panel; generate wire routes from selected points on the floorplan to a desired electrical panel of the at least one electrical panel, wherein generating wire routes comprises generating a straight-line path from one of the selected points to the desired electrical panel when a direct route is selected; and generate a cost for each of the wire routes generated.

In accordance with one aspect of the present application, a computing device is disclosed. The computing device has a processor. A display is coupled to the processor. A user interface is coupled to the processor for entering data into the computing device. A memory coupled to the processor, the memory storing program instructions that when executed by the processor, causes the processor to: display a floorplan of a blueprint file, wherein the blueprint file is a non-CAD file; select a scale factor for the floorplan; mark and labeling at least one electrical panel; generate wire routes from selected points on the floorplan to a desired electrical panel of the at least one electrical panel, wherein generating wire routes comprises: generating a straight-line path from one of the selected points to the desired electrical panel when a direct route is selected; and generating a multi-line path from one of the selected points to the desired electrical panel when an orthogonal route is selected, wherein adjacent lines of the multi-line path are orthogonal to one another generate a cost for each of the wire routes generated; and generate an estimated material takeoff window, the estimated material takeoff window displaying calculated estimated costs for selected wire routes generated.

BRIEF DESCRIPTION OF THE DRAWINGS

Embodiments of the disclosure will become more fully understood from the detailed description and the accompanying drawings, wherein.

DESCRIPTION OF THE INVENTION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure relates to a construction cost estimation application. The construction cost estimation application allows for a non-CAD blueprint file to be loaded; electrical, mechanical, plumbing and other construction features to be manually or automatically drawn; and a cost estimated associated with the installation of the electrical, mechanical, plumbing and other construction features to be calculated.

Figure 1:
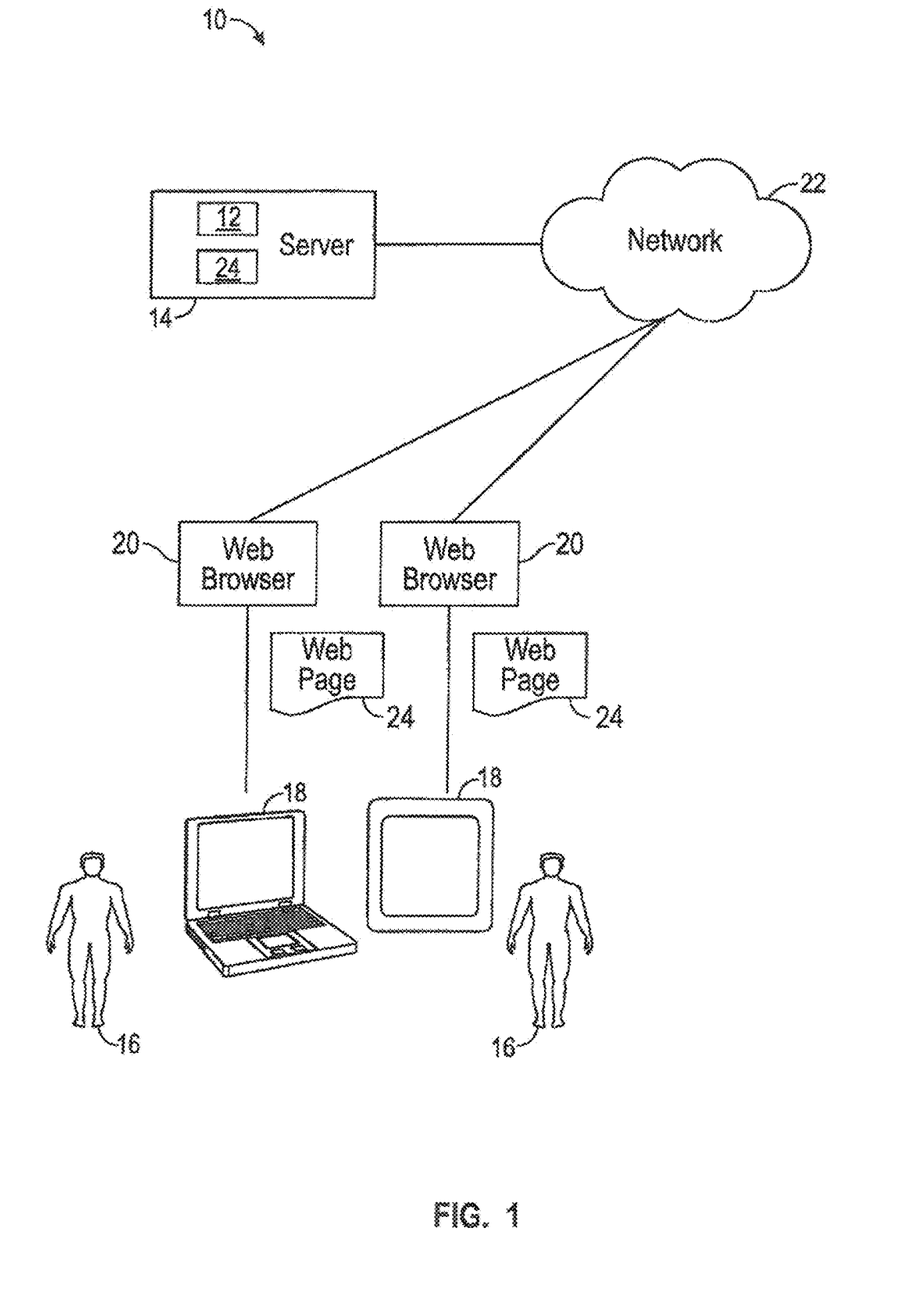
FIG. 1 is a block diagram of an exemplary cost estimation system in accordance with one embodiment of the present invention.

Referring now to FIG. 1, a system 10 may be shown. The system 10 may provide a construction cost estimation application 12 (hereinafter application 12) that may allow for a non-CAD blueprint file to be loaded, electrical wiring/cable to be manually or automatically drawn between a device needing electrical power and an electrical panel and a cost estimated associated with the electrical wiring/cable installation to be calculated, as well as other features that may be described below. The system 10 may have a server 14. The server 14 may be used to host/store the application 12 of the present invention. Individuals 16 may use one or more computing devices 18 to access and/or download the application 12 that may be hosted on the server 14. Alternatively, the application 12 may be stored on a memory device which is given to the individual 16 in order to download the application onto the computing device 18.

The computing devices 18 may be a personal computer system, handheld or laptop device, server computer system, multiprocessor system, microprocessor-based system, set top boxes, programmable consumer electronics, network PCs, and distributed cloud computing environments that include any of the above systems or devices, and the like. The computing device 18 may be described in the general context of computer system executable instructions, such as program modules, being executed by a computer system as may be described below.

The computing device 18 may be loaded with an operating system. The operating system of the computing device 18 may manage hardware and software resources of the computing device 18 and provide common services for computer programs running on the computing device 18. The computing device 18 may be loaded with a web browser 20. The web browser 20 may allow the computing device 18 to gain online access to a network 22 such as the World Wide Web. The web browser 20 may be Microsoft® Internet Explorer, Google® Chrome, Mozilla® Firefox, Apple® Safari or similar browsing applications. By connecting to the network 22, the computing device 18 may access a website 24 associated with the application 12 hosted/stored on the server 14.

Figure 2:
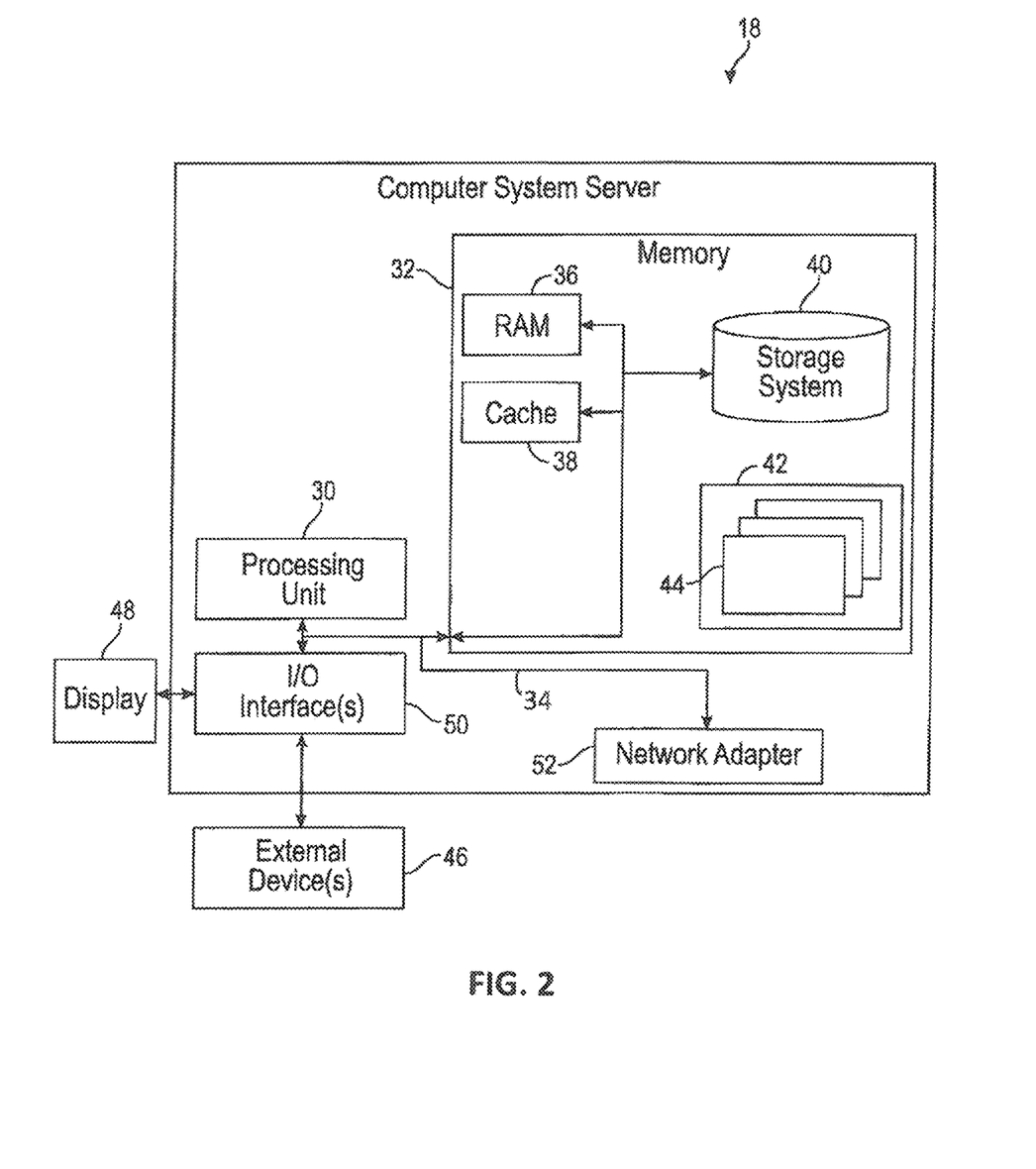
FIG. 2 is a block diagram of an exemplary computing device used in the cost estimation system of FIG. 1 in accordance with one embodiment of the present invention.

Referring now to FIG. 2, the computing devices 18 may be described in more detail in terms of the machine elements that provide functionality to the systems and methods disclosed herein. The components of the computing devices 18 may include, but are not limited to, one or more processors or processing units 30, a system memory 32, and a system bus 34 that couples various system components including the system memory 32 to the processor 30. The computing devices 18 may typically include a variety of computer system readable media. Such media could be chosen from any available media that is accessible by the computing devices 18, including non-transitory, volatile and non-volatile media, removable and non-removable media. The system memory 32 could include one or more computer system readable media in the form of volatile memory, such as a random access memory (RAM) 36 and/or a cache memory 38. By way of example only, a storage system 40 may be provided for reading from and writing to a non-removable, non-volatile magnetic media device typically called a "hard drive".

The system memory 32 may include at least one program product/utility 42 having a set (e.g., at least one) of program modules 44 that may be configured to carry out the functions of embodiments of the invention. The program modules 44 may include, but is not limited to, an operating system, one or more application programs, other program modules, and program data. Each of the operating systems, one or more application programs, other program modules, and program data or some combination thereof, may include an implementation of a networking environment. The program modules 44 generally carry out the functions and/or methodologies of embodiments of the invention as described herein. For example, the program modules 44 may carry out the steps for initiating an event creation, private and group communication between invitees to the event created, visual and/or textual summaries of past events of individuals and other functionality as will be described below.

The computing device 18 may communicate with one or more external devices 46 such as a keyboard, a pointing device, a display 48, and/or any similar devices (e.g., network card, modem, etc.) that enable the computing device 18 to communicate with the server 14 (FIG. 1). In accordance with one embodiment, the display 48 may be a touch screen display allowing the display 48 to function as an Input/Output device. Such communication may occur via Input/Output (I/O) interfaces 50. Alternatively, the computing devices 18 may communicate with one or more networks such as a local area network (LAN), a general wide area network (WAN), and/or a public network (e.g., the network 24 shown in FIG. 1) via a network adapter 52. As depicted, the network adapter 52 may communicate with the other components of the computing device 18 via the bus 36.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 40) may be utilized. In the context of this disclosure, a computer readable storage medium may be any tangible or non-transitory medium that can contain, or store a program (for example, the program product 42) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Referring to the FIGs, one embodiment of operation of the application 12 may be described. In the present embodiment, the application is being described as it relates to estimating the cost for the installation of electrical wiring/cable. However, the application 12 may be used for construction estimation for any specialty contractors, including, but not limited to: electrical, low voltage, plumbing, sprinkler piping, mechanical, gas, and the like.

Figure 3:
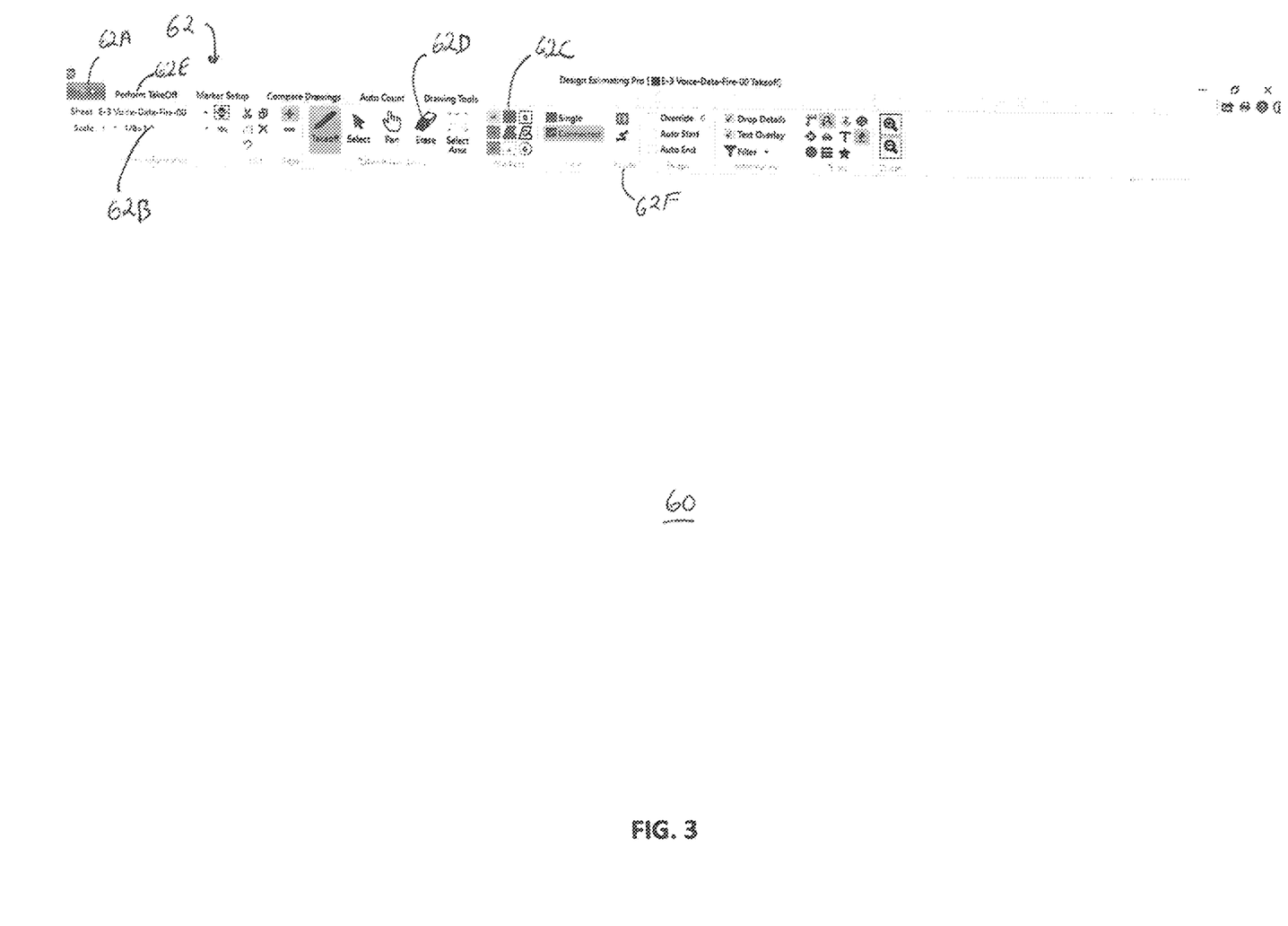
FIG. 3 is an exemplary home page which may be displayed on the computing device of FIG. 1 in accordance with one embodiment of the present invention.

To access the application 12, individuals 16 may access the webpage 24 in order to use the application 12 via the webpage 24, download the application via the webpage 24, download the application 12 onto the computing device 18 from a memory device given to the individual 16 or by other similar means. Once the individual 16 accesses the application 12, the individual 16 may see a home screen 60 as shown in FIG. 3. The home screen 60 may show a blank display with a menu bar 62. In the present embodiment, the menu bar 62 may be seen in a top of the home screen 60. However, this is shown as an example and should not be seen in a limiting manner.

Once the application 12 has been accessed, the individual 16 using the application 12 may load a blueprint/floorplan 64 to the application 12. The individual 16 may load a blueprint/floorplan 64 to the application 12 by using an external device 46 (i.e. keyboard, mouse, etc.) of the computing device 18. The individual 16 may use an external device 46 to access a drop-down menu from the menu bar 62 and open a file containing the blueprint/floorplan 64. The file containing the blueprint/floorplan 64 may be a Portable Document Format (PDF) file, a Tagged Image File Format (TIFF) file, a Joint Photographic Experts Group (JPEG) file, and the like. In general, any type of non-CAD file not containing design data information may be used. In the present embodiment, the individual 16 may use an external device 46 to left click the File tab 62A. This may access a drop-down menu for opening the file containing the blueprint/floorplan 64.

Figure 4:
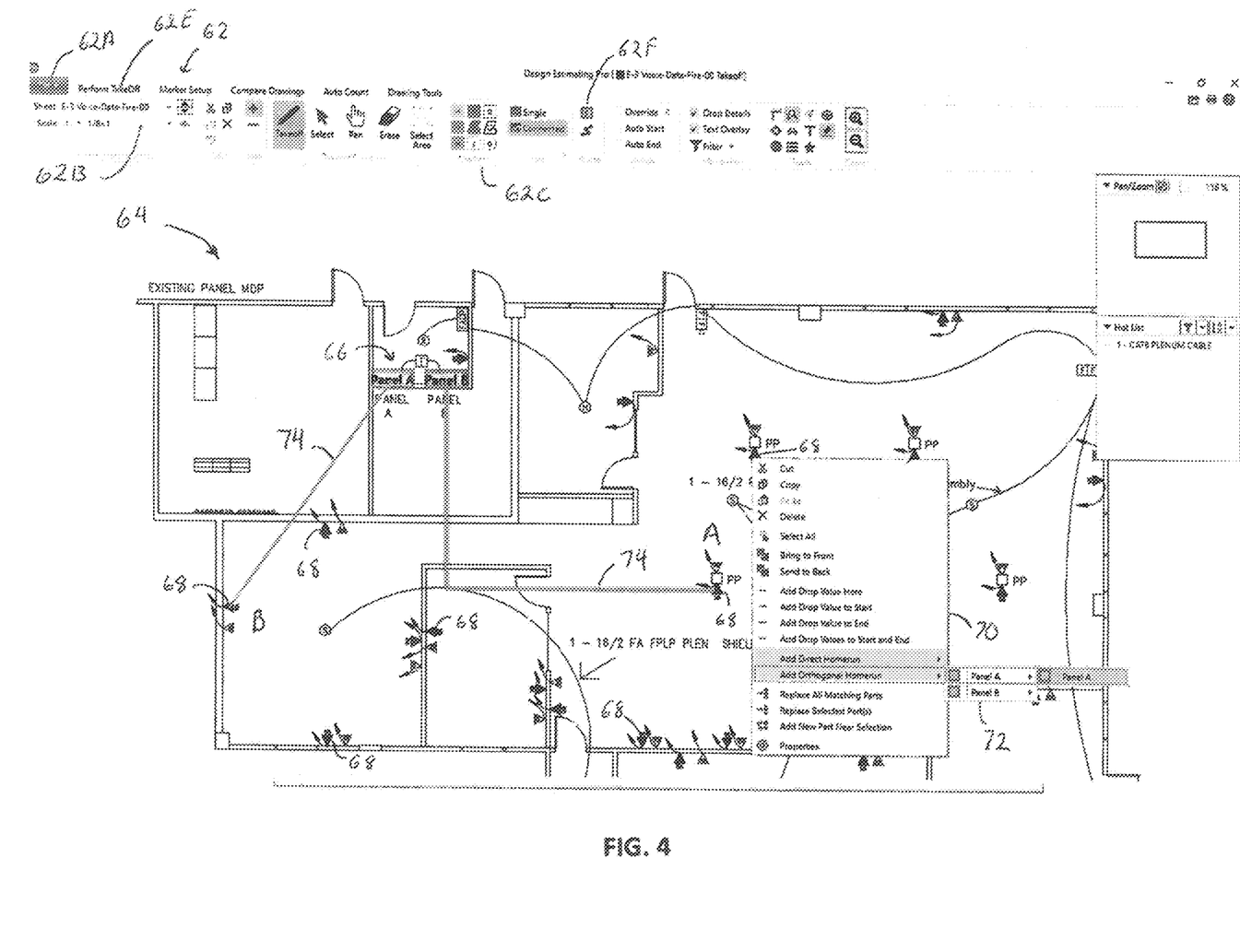
FIG. 4 is an exemplary screen shot showing auto generated wiring routes which may be displayed on the computing device of FIG. 1 in accordance with one embodiment of the present invention.

Once the file containing the blueprint/floorplan 64 is opened, the blueprint/floorplan 64 may be displayed on a screen of the computing device 18 as may be seen in FIG. 4. The individual 16 may then designate a scale for the blueprint/floorplan 64. The scale of the blueprint/floorplan 64 may be designated by entering the scale information in the Scale area 62B of the menu bar 62 wherein the scale information is the proportion on the drawing to actual dimensions. An individual 16 may enter the scale information into the Scale Area 62B by using an external device 46 (i.e. keyboard, mouse, etc.) of the computing device 18.

Once the scale information has been entered, the application 12 may allow electrical wiring/cable routes to be manually or automatically drawn between a device needing electrical power and an electrical panel and a cost estimated associated with the electrical wiring/cable installation to be calculated. To perform this function, the individual 16 may designate and label the electrical panels 66 shown on the blueprint/floorplan 64. In the present embodiment, the electrical panels 66 may be marked and labeled as Panel A and Panel B. In order to designate and label the electrical panels 66, the individual 16 may use an external device 46 (i.e. keyboard, mouse, etc.) of the computing device 18 to select a desired label from a Route area 62F of the menu bar 62. The individual 16 may then use the external device 46 of the computing device 18 to mark and label one or more electrical panels 66 on the blueprint/floorplan 64.

The blueprint/floorplan 64 may have the locations indicated for where electrical power may be needed. In the present embodiment, power outlets 68 are pre-drawn on the blueprint/floorplan 64. To estimate the cost associated with running electrical wiring/cable from the power outlet 68 to one of the electrical panels 66, the individual 16 may move a cursor using an external device 46 (i.e. keyboard, mouse, etc.) of the computing device 18 to a desired power outlet 68. The individual 16 may then bring up a menu 70. The menu 70 may display predefined routing options for the electrical wiring/cable as well as a listing of the defined electrical panel 66. As may be seen in FIG. 4, the menu 70 may list two predefined routing options, a direct route, identified as a Direct Homerun, and an orthogonal route, identified as an Orthogonal Homerun. The direct route may be defined as a straight line from a selected power outlet 68 to a selected electrical panel 66. The orthogonal route may be defined as a multi-line route from a selected power outlet 68 to a selected electrical panel 66 wherein each line runs in either a horizontal or vertical direction and adjacent lines of the multi-line route are at right-angles.

In accordance with one embodiment, the individual 16 may move a cursor using an external device 46 (i.e. keyboard, mouse, etc.) of the computing device 18 to a desired power outlet 68. In the present embodiment, the individual 16 moves the cursor of the computing device 18 to the power outlet 68 labeled as A. The individual 16 may then right click the external device 46 to display the menu 70. Using the external device 46, the individual may then select a predefined routing option, i.e., a direct route, identified as a Direct Homerun, and an orthogonal route, identified as an Orthogonal Homerun. When a desired predefined routing option has been selected, a submenu 72 may be displayed listing the available electrical panels 66. As may be seen in the present embodiment, the Orthogonal Homerun route was selected and the submenu 72 may then list the available electrical panels 66 from which to choose, i.e., Panel A and Panel B. Once an electrical panel 66 is selected, the application 12 may automatically generate the electrical wiring/cable route 74. In the present embodiment, the individual 16 selected Panel B as the desired electrical panel 66. Thus, the application 12 may generated an orthogon route from the selected power outlet 68 to electrical panel 66, Panel B. As may be seen in FIG. 4, the orthogon route may run horizontally from the outlet 68 to an area below the electrical panel 66 and then vertically directly up to the electrical panel 66.

In a similar manner, the individual 16 may move the cursor of the computing device 18 to the power outlet 68 labeled as B. The individual 16 may then right click the external device 46 to display the menu 70. Using the external device 46, the individual 16 may then select a predefined routing option. In the present embodiment, the individual 16 selected a direct route, identified as a Direct Homerun, to the electrical panel 66, Panel A. Thus, the application 12 may generate the electrical wiring/cable route 74 from the selected power outlet 68, labeled B to electrical panel 66, Panel B. As may be seen in FIG. 4, the electrical wiring/cable route 74 may be a straight diagonal line drawn from the outlet 68 labeled B to the electrical panel 66, Panel A.

Thus, unlike the prior art where all electrical wiring/cable route had to be manually drawn from the device needing electrical power to the electrical panel, the application 12 may automatically generate the electrical wiring/cable routes 74.

Figure 5:
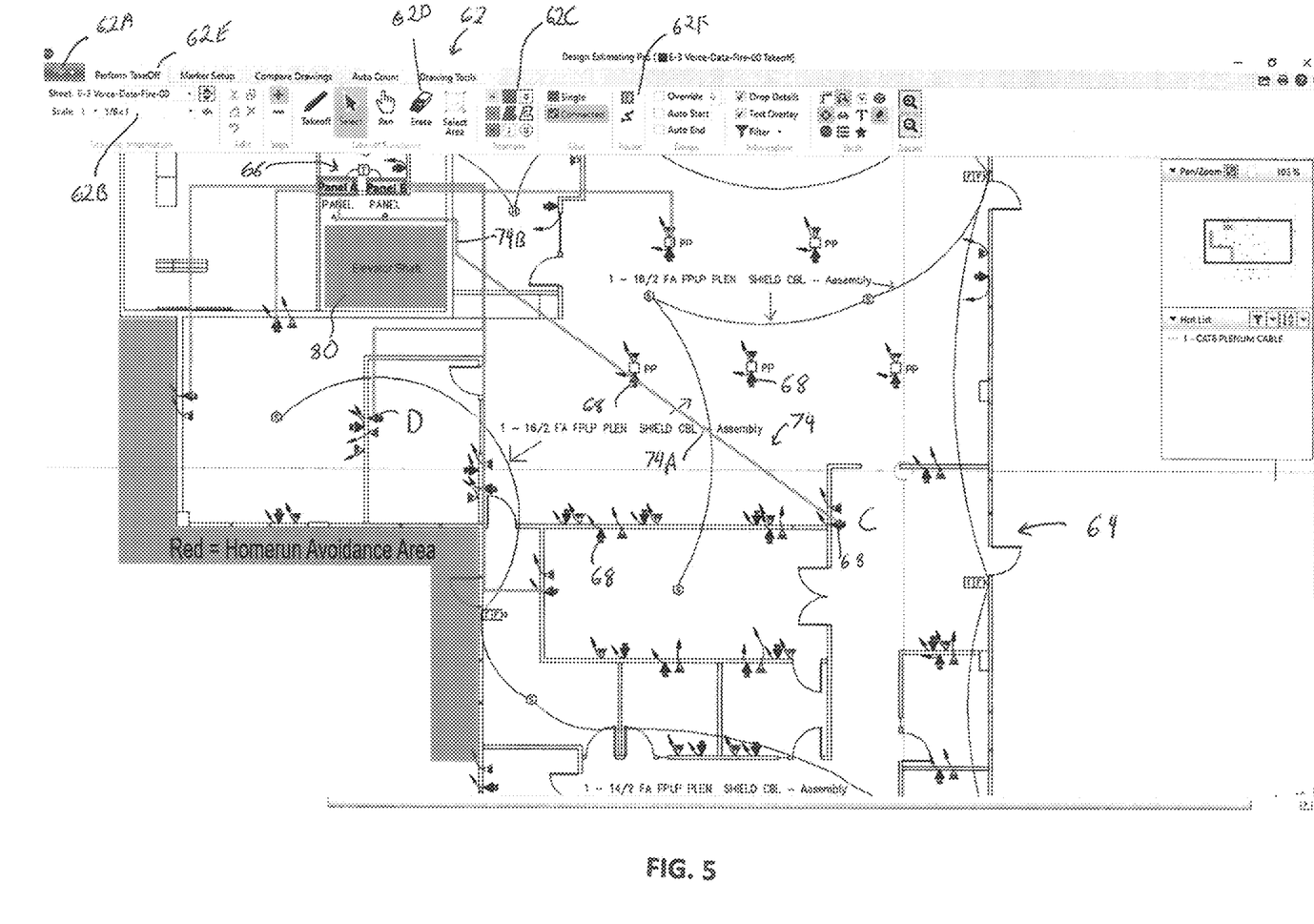
FIG. 5 is an exemplary screen shot showing wiring routes avoiding predefined area which may be displayed on the computing device of FIG. 1 in accordance with one embodiment of the present invention.

Referring to FIG. 5, the application 12 may allow the individual 16 to identify and mark as non-electrical wiring/cable routing areas 80 (hereinafter non-routing areas 80). The non-routing areas 80 may be areas where the individual 16 may prefer not to have electrical wiring/cable runs due to aesthetics and/or safety issues. For example, most people generally would prefer not to have electrical wiring/cables run through/across an atrium or similar area due to aesthetic reasons. Electrical wiring/cables are also generally not run through elevator shafts or other similar areas due to safety issues.

In order to establish the non-electrical wiring/cable routing areas 80, the individual 16 may use an external device 46 (i.e. keyboard, mouse, etc.) of the computing device 18 to select and mark the non-electrical wiring/cable routing areas 80. The individual 16 may selected a label associated with the non-electrical wiring/cable routing areas 80 from the Marker area 62C of the menu bar 62. The individual 16 may then use the external device 46 of the computing device 18 to mark one or more areas on the blueprint/floorplan 64 as a non-electrical wiring/cable routing area 80.

The application 12 may be configured so that the electrical wiring/cable routes 74 generated do not run through the non-electrical wiring/cable routing areas 80. The electrical wiring/cable route 74 generated may be based on the type of route selected. For example, if a direct route, i.e., Direct Homerun, is selected, the electrical wiring/cable route 74 will run in a straight line towards the selected electrical panel 66 until the electrical wiring/cable route 74 reaches the non-electrical wiring/cable routing area 80. The electrical wiring/cable route 74 may then use one or more orthogonal routes, i.e., Orthogonal Homerun, around the non-electrical wiring/cable routing area 80 to the electrical panel 66.

An example of the avoidance of the non-electrical wiring/cable routing area 80 for a direct route, i.e., Direct Homerun, may be seen for the power outlet 68 labeled as C as may be seen in FIG. 5. In this example, a direct route, i.e., Direct Homerun, may be selected for the power outlet 68 labeled as C to the electrical panel 66, labeled as Panel A. An electrical wiring/cable route 74 may be generated wherein a first section 74A of the electrical wiring/cable route 74 runs in a straight diagonal line from the power outlet 68 labeled as C, until the first section 74A of the electrical wiring/cable route 74 reaches the non-electrical wiring/cable routing area 80. The electrical wiring/cable route 74 may then have a second section 74B which uses an orthogonal route, i.e., Orthogonal Homerun, around the non-electrical wiring/cable routing area 80 to the electrical panel 66, Panel A. In the present embodiment, a three line orthogonal route may be used wherein adjacent lines of the three line orthogonal route may be perpendicular to one another.

If an orthogonal route, i.e., Orthogonal Homerun, is selected, in order to avoid the non-electrical wiring/cable routing areas 80, the electrical wiring/cable route 74 may use a multi-line orthogonal route around the non-electrical wiring/cable routing area 80 to the electrical panel 66. For example, an orthogonal route, i.e., Orthogonal Homerun, may be selected for the power outlet 68 labeled as D as may be seen in FIG. 5 to the electrical panel 66, Panel B. The electrical wiring/cable route 74 use a four line orthogonal route from the power outlet 68 labeled as D to the electrical panel 66, Panel B wherein adjacent lines of the three line orthogonal route may be perpendicular to one another.

Figure 6:
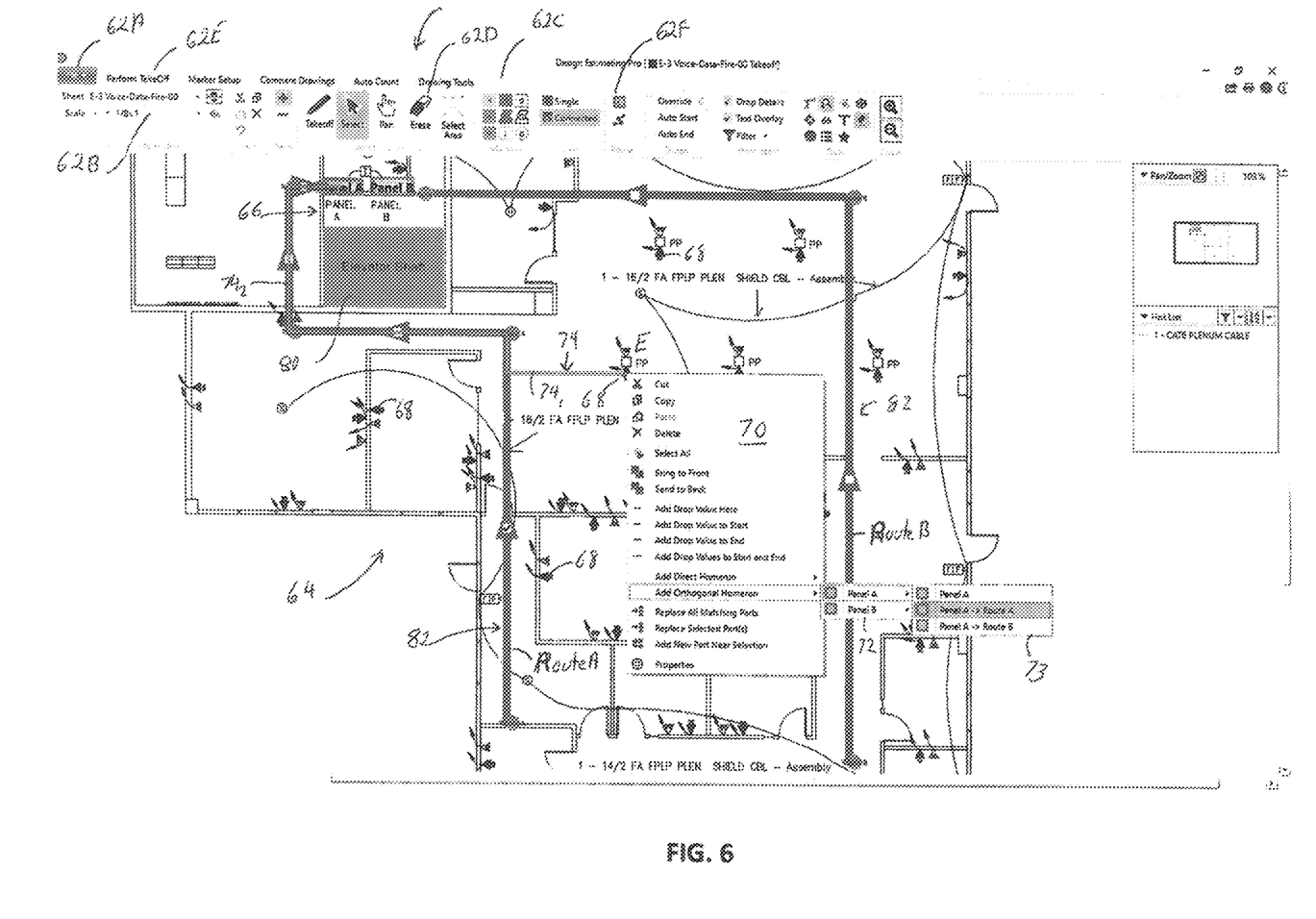
FIG. 6 is an exemplary screen shot showing manually entered wiring routes which may be displayed on the computing device of FIG. 1 in accordance with one embodiment of the present invention.

The application 12 may be configured to allow the individual 16 to manually form one or more electrical wiring/cable routes 82. These manually formed electrical wiring/cable routes 82 may be routes for wire/cable trays or the like. Wire/cable trays are rigid trays used to support insulated electrical cables and wires used for power distribution, control, and communication. Wire/cable trays may be used as an alternative to open wiring or electrical conduit systems, and are commonly used for cable management in commercial and industrial construction. They are especially useful in situations where changes to a wiring system are anticipated, since new cables/electrical wiring can be installed by laying them in the tray, instead of pulling them through a pipe.

In order to establish the manually formed electrical wiring/cable routes 82, the individual 16 may use an external device 46 (i.e. keyboard, mouse, etc.) of the computing device 18 to selected a label associated with the manually formed electrical wiring/cable routes 82 from the Route area 62F of the menu bar 62. The individual 16 may then use the external device 46 of the computing device 18 to move a cursor to mark on the blueprint/floorplan 64 the manually formed electrical wiring/cable routes 82. If any mistakes are made while forming the manually formed electrical wiring/cable routes 82, the individual 16 may use an Erase tab 62D to remove any section(s) of the manually formed electrical wiring/cable routes 82. Once the manually formed electrical wiring/cable routes 82 are formed, the application 12 may offer the manually formed electrical wiring/cable routes 82 as an option when forming the electrical wiring/cable routes 74.

In accordance with an embodiment shown in FIG. 6, two manually formed electrical wiring/cable routes 82 may be show. In this embodiment, the individual 16 manually added two manually formed electrical wiring/cable routes 82 labeled as Route A and Route B. As stated above, the manually formed electrical wiring/cable routes 82 labeled as Route A and Route B may be used as wire/cable trays.

With the manually formed electrical wiring/cable routes 82 established, the application 12 may use the manually formed electrical wiring/cable routes 82 when forming the electrical wiring/cable route 74. If the individual 16 decides to use the manually formed electrical wiring/cable routes 82, the application 12 may first establish a route from the power outlet 68 to a desired manually formed electrical wiring/cable route 82 and then run the remainder of the route through the desired manually formed electrical wiring/cable routes 82 to the selected electrical panel 66.

As an example, in FIG. 6, the individual 16 may wish to form the electrical wiring/cable route 74 from the power outlet 68 labeled as E to the electrical panel 66, Panel A. The individual 16 may move the cursor of the computing device 18 to the power outlet 68 labeled as E. The individual 16 may then right click the external device 46 to display the menu 70. As in the previous embodiments, the menu 70 may display the predefined routing options Direct Homerun and Orthogonal Homerun. Using the external device 46, the individual may then select one of the predefined routing options.

In the present embodiment, the individual 16 selected an Orthogonal Homerun from the power outlet 68 labeled as E.

Once the Orthogonal Homerun is selected, the submenu 72 may appear and list the available electrical panels 66 from which to choose, i.e., Panel A and Panel B. When one of the available electrical panels 66 is selected, another submenu 73 may be displayed. The submenu 73 may allow the individual 16 to select if a regular orthogonal route to the selected electrical panel 66 should be drawn or an orthogonal route through one of the manually formed electrical wiring/cable routes 82 should be drawn to the selected electrical panel 66.

In the present embodiment, the individual 16 initially selects an Orthogonal Homerun from the power outlet 68 labeled as E to the electrical panel 66 labeled Panel A through the manually formed electrical wiring/cable routes 82, Route A. The application 12 may then generate the electrical wiring/cable route 74 wherein a first section $74_1$ of the electrical wiring/cable route 74 is one of a vertical or horizontal line from the from the power outlet 68 labeled as E to the manually formed electrical wiring/cable routes 82, Route A. A second section $74_2$ of the electrical wiring/cable route 74 then runs along the manually formed electrical wiring/cable routes 82, Route A to the electrical panel 66 labeled Panel A. It should be noted that while the first section $74_1$ of the electrical wiring/cable route 74 shows a single vertical or horizontal line to the manually formed electrical wiring/cable route 82, Route A, it could be formed of multiple horizontal/vertical lines wherein adjacent lines may be perpendicular to one another. This may be required to avoid the non-electrical wiring/cable routing areas 80.

Once the electrical wiring/cable routes 74 have been established on the blueprint/floorplan 64, the application 12 may generate an estimated cost for the electrical wiring/cable installation. As may be seen in FIG. 7, the application 12 may generate an estimated material takeoff window 84. The estimated material takeoff window 84 may display the calculated estimated cost for the electrical wiring/cable installation for selected electrical wiring/cable routes 74. The estimated material takeoff window 84 may display all the selected electrical wiring/cable routes 74, the materials used in the selected electrical wiring/cable routes 74 and the estimated cost for the selected electrical wiring/cable routes 74.

Figure 7:
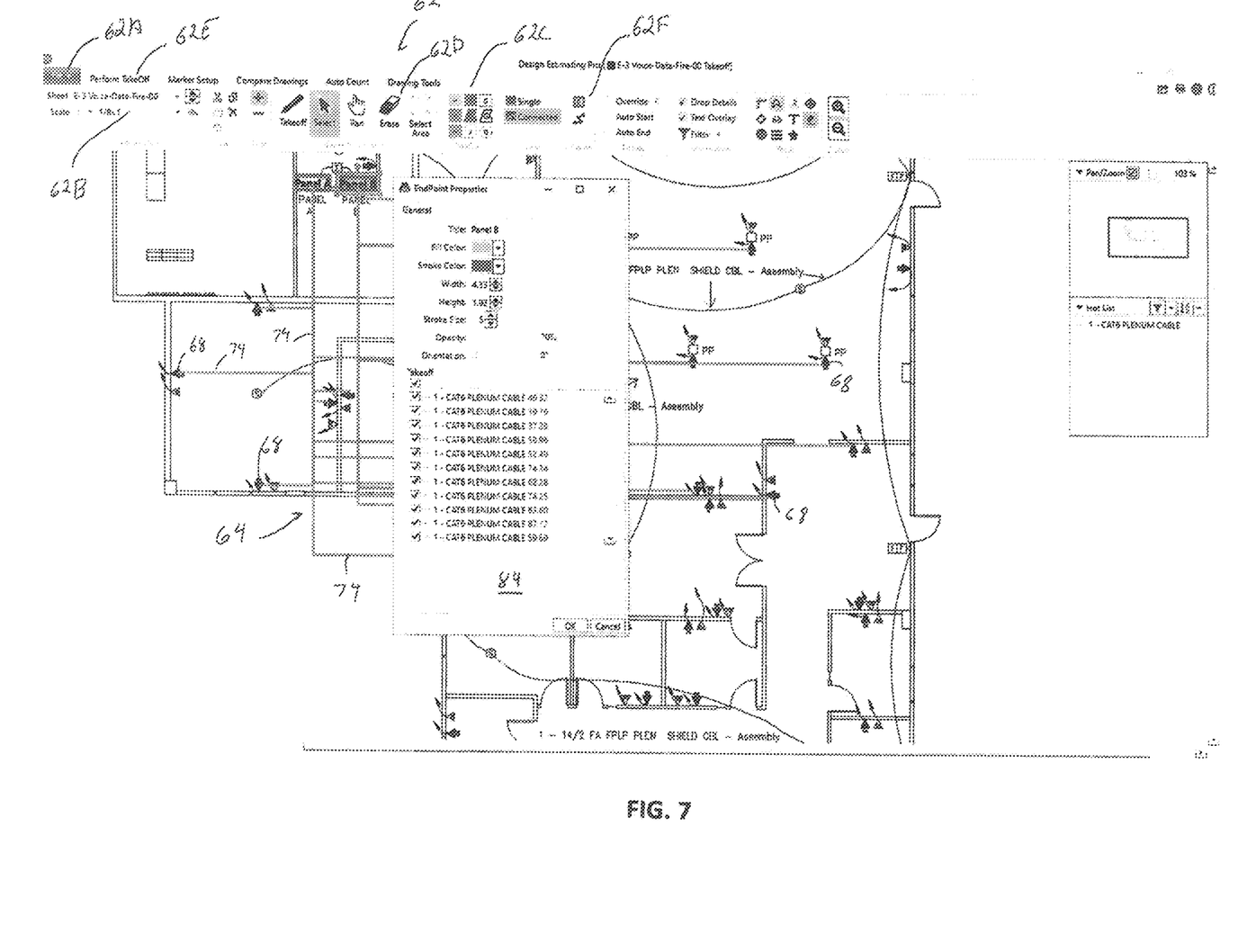
FIG. 7. is an exemplary screen shot showing electrical wiring cost estimation which may be displayed on the computing device of FIG. 1 in accordance with one embodiment of the present invention.

To generate the estimated cost for the electrical wiring/cable installation, the individual 16 may use an external device 46 of the computer 18 to select the Perform Takeoff Tab 62E. Selecting the Perform Takeoff Tab 62E may display a submenu of options for generating the estimated material takeoff window 84. The submenu may contain a listing of materials to be used for calculating the cost for each selected electrical wiring/cable routes 74. In the present embodiment, the material selected was CAT 6 Cable. However, other materials may be selected and used in the calculations. For example, the individual 16 may select a certain size aluminum conduit and wiring to be used in the calculations, fiberoptic cable, or the like. The application 12 may be configured to provide a listing of the common material used for electrical cable/wiring installation.

The submenu may allow the individual 16 to select which electrical wiring/cable routes 74 may be used for generating the estimated material takeoff window 84. For example, the submenu may allow the individual 16 to select all of the electrical wiring/cable routes 74 created on the blueprint/floorplan 64, generate a window using an external device 46 of the computer 18 to select the desired electrical wiring/cable routes 74 on the blueprint/floorplan 64, and the like.

Once the desired electrical wiring/cable routes 74 have been selected, the application 12 may generate the estimated material takeoff window 84.

In order to generate the estimated material takeoff window 84, the application 12 may need to calculate the cost of material associated with each of the selected electrical wiring/cable routes 74. The application 12 may accomplish this by measuring a line length of each of the selected electrical wiring/cable routes 74 and multiplying the length by the scale information entered into the Scale Area 62B. This may allow the application 12 to find the actual length of each of the selected electrical wiring/cable routes 74. The actual length of each of the selected electrical wiring/cable routes 74 may then be multiplied by a material cost selected to generate the estimated cost for the electrical wiring/cable installation for each of the selected electrical wiring/cable routes 74.

Once the estimated cost for the electrical wiring/cable installation for each of the selected electrical wiring/cable routes 74 has been calculated, the application 12 may generate the estimated material takeoff window 84. The estimated material takeoff window 84 may display the calculated estimated cost for the electrical wiring/cable installation for each of the selected electrical wiring/cable routes 74. The estimated material takeoff window 84 may display all the selected electrical wiring/cable routes 74, the materials used in the selected electrical wiring/cable routes 74 and the estimated cost for the selected electrical wiring/cable routes 74. The estimated material takeoff window 84 may allow the individual 16 to deselect any of the selected electrical wiring/cable routes 74 by using an external device 46 of the computing device 18 to unclick any of the selected electrical wiring/cable routes 74 to see an adjusted estimated cost for the electrical wiring/cable installation.

The application 12 is a construction cost estimation application. The application 12 allows for a non-CAD blueprint file to be loaded, electrical wiring/cable routes to be manually or automatically drawn between a device needing electrical power and an electrical panel and a cost estimated associated with the electrical wiring/cable installation to be calculated.

The foregoing description is illustrative of particular embodiments of the invention, but is not meant to be a limitation upon the practice thereof. The following claims, including all equivalents thereof, are intended to define the scope of the invention.

What is claimed is:

1. A computing device comprising:
   a processor;
   a display coupled to the processor;
   a user interface coupled to the processor for entering data into the computing device; and
   a memory coupled to the processor, the memory storing program instructions that when executed by the processor, causes the processor to:
   display a floorplan of a blueprint file, wherein the blueprint file is a non-CAD file;
   select a scale factor for the floorplan;
   mark and labeling at least one electrical panel;
   generate wire routes from selected points on the floorplan to a desired electrical panel of the at least one electrical panel, wherein generating wire routes comprises generating a straight-line path from one of the selected points to the desired electrical panel when a direct route is selected; and
   generate a cost for each of the wire routes generated.

2. The computing device of claim 1, wherein generating wire routes comprises generating a multi-line path from one of the selected points to the desired electrical panel when an orthogonal route is selected, wherein adjacent lines of the multi-line path are orthogonal to one another.

3. The computing device of claim 2, wherein each line of the multi-line path runs one of a horizontal direction or a vertical direction.

4. The computing device of claim 1, wherein the memory causes the processor to mark at least one non-wiring area on the floorplan.

5. The computing device of claim 4, wherein generate wire routes comprises generating a first section wherein the first section is a first section straight line from one of the selected points to the at least one non-wiring area and generating a second section, wherein the second section is a second section multi-line path to the desired electrical panel.

6. The computing device of claim 5, wherein the second section multi-line path is a plurality of lines around the at least one non-wiring area, wherein adjacent lines of the plurality of lines are orthogonal to one another when the direct route is selected.

7. The computing device of claim 1, wherein the memory causes the processor to mark at least one cable route on the floorplan.

8. The computing device of claim 7, wherein generate wire routes comprises generating a first section wherein the first section is a first line from one of the selected points to the at least one cable route and generating a second section, wherein the second section is a second section multi-line path following the at least one cable route when an orthogonal route is selected.

9. The computing device of claim 8, wherein the first line is one of a vertical line or a horizontal line from one of the selected points to the at least one cable route.

10. The computing device of claim 1, wherein the memory causes the processor to generate an estimated material takeoff window, the estimated material takeoff window displaying calculated estimated costs for each of the wire routes.

11. The computing device of claim 10, wherein the estimated material takeoff window displays a material used in calculating the estimated costs for each of the wire routes.

12. The computing device of claim 1, wherein the memory causes the processor to generate an estimated material takeoff window, the estimated material takeoff window displaying calculated estimated costs for selected wire routes.

13. A computing device comprising:
a processor;
a display coupled to the processor;
a user interface coupled to the processor for entering data into the computing device; and
a memory coupled to the processor, the memory storing program instructions that when executed by the processor, causes the processor to:
display a floorplan of a blueprint file, wherein the blueprint file is a non-CAD file;
select a scale factor for the floorplan;
mark and labeling at least one electrical panel;
generate wire routes from selected points on the floorplan to a desired electrical panel of the at least one electrical panel, wherein generating wire routes comprises:
generating a straight-line path from one of the selected points to the desired electrical panel when a direct route is selected;
generating a multi-line path from one of the selected points to the desired electrical panel when an orthogonal route is selected, wherein adjacent lines of the multi-line path are orthogonal to one another;
generate a cost for each of the wire routes generated; and
generate an estimated material takeoff window, the estimated material takeoff window displaying calculated estimated costs for selected wire routes generated.

14. The computing device of claim 13, wherein each line of the multi-line path runs one of a horizontal direction or a vertical direction.

15. The computing device of claim 13, wherein the memory causes the processor to mark at least one non-wiring area on the floorplan.

16. The computing device of claim 15, wherein generate wire routes comprises generating a first section wherein the first section is a first section straight line from one of the selected points to the at least one non-wiring area and generating a second section, wherein the second section is a second section multi-line path to the desired electrical panel.

17. The computing device of claim 16, wherein the second section multi-line path is a plurality of lines around the at least one non-wiring area, wherein adjacent lines of the plurality of lines are orthogonal to one another when the direct route is selected.

18. The computing device of claim 13, wherein the memory causes the processor to mark at least one cable route on the floorplan.

19. The computing device of claim 18, wherein generate wire routes comprises generating a first section wherein the first section is a first line from one of the selected points to the at least one cable route and generating a second section, wherein the second section is a second section multi-line path following the at least one cable route when an orthogonal route is selected.

20. The computing device of claim 19, wherein the first line is one of a vertical line or a horizontal line from one of the selected points to the at least one cable route.

* * * * *